US006452400B1

(12) United States Patent
Kawai et al.

(10) Patent No.: US 6,452,400 B1
(45) Date of Patent: Sep. 17, 2002

(54) METHOD OF MEASURING NEGATIVE ION DENSITY OF PLASMA AND PLASMA PROCESSING METHOD AND APPARATUS FOR CARRYING OUT THE SAME

(75) Inventors: Yoshinobu Kawai; Yoko Ueda, both of Fukuoka; Nobuo Ishii, Minoo; Satoru Kawakami, Sagamihara, all of (JP)

(73) Assignee: Tokyo Electron Limited, Tokyo (JP)

( * ) Notice: Subject to any disclaimer, the term of this patent is extended or adjusted under 35 U.S.C. 154(b) by 165 days.

(21) Appl. No.: 09/597,654

(22) Filed: Jun. 19, 2000

Related U.S. Application Data

(63) Continuation of application No. PCT/JP99/05792, filed on Oct. 20, 1999.

(30) Foreign Application Priority Data

Oct. 20, 1998 (JP) .......................................... 10-316859

(51) Int. Cl.[7] ................................................ G01N 27/62

(52) U.S. Cl. ...................... 324/459; 324/71.1; 324/630; 324/642; 438/17; 438/727

(58) Field of Search ................................ 324/645, 459, 324/646, 668, 630, 637, 639, 642, 644, 719, 71.1; 702/65; 427/578; 118/723, 712; 438/727, 17, 728; 216/61, 69

(56) References Cited

U.S. PATENT DOCUMENTS 6,071,573 A * 6/2000 Koemtzopoulos ........... 427/578
6,192,318 B1 * 2/2001 Yogo ........................... 702/65
6,230,652 B1 * 5/2001 Tanaka ........................ 118/723
6,271,148 B1 * 8/2001 Kao ............................ 438/727

FOREIGN PATENT DOCUMENTS

| | | |
|---|---|---|
| JP | 63-248100 | 10/1988 |
| JP | 63-257199 | 10/1988 |
| JP | 5-13194 | 1/1993 |
| JP | 5-82289 | 4/1993 |
| JP | 5-129093 | 5/1993 |
| JP | 5-299194 | 11/1993 |

* cited by examiner

*Primary Examiner*—Michael Sherry
*Assistant Examiner*—Trung Nguyen
(74) *Attorney, Agent, or Firm*—Finnegan, Henderson, Farabow, Garrett & Dunner LLP

(57) ABSTRACT

A probe (6) is brought into contact with a plasma produced by ionizing Ar gas, a saturation current ($I_{es2}$) at which current flowing through the probe is saturated when the potential of the probe is changed in a potential region where the potential of the probe is higher than a ground potential, and a saturation current ($I_{is2}$) at which current flowing through the probe is saturated when the potential of the probe is changed in a potential region where the potential of the probe is lower than the ground potential. Similarly, saturation currents ($I_{es2}$, $I_{is2}$) are measured by bringing the probe (6) into contact with a plasma produced by ionizing a mixed gas containing Ar gas and a process gas, such as $C_4F_8$ gas, and changing the potential of the probe (6). The negative ion density of the plasma produced by ionizing $C_4F_8$ gas is determined by using saturation current ratios ($I_{is1}/I_{is2}$, $I_{es1}/I_{es2}$).

8 Claims, 6 Drawing Sheets

METHOD OF MEASURING NEGATIVE ION DENSITY OF PLASMA AND PLASMA PROCESSING METHOD AND APPARATUS FOR CARRYING OUT THE SAME

This application is a continuation of international application number PCT/JP99/05792, filed Oct. 20, 1999, the content of which is incorporated herein by reference.

FIELD OF THE INVENTION

The present invention relates to a method of measuring the negative ion density of a plasma, a plasma processing method and a plasma processing system.

BACKGROUND OF THE INVENTION

An electron cyclotron resonance plasma processing method (ECR plasma processing method) that produces a microwave discharge by utilizing absorption of the energy of a microwave by electrons in cyclotron motion by resonance has become noticed as a method of using a plasma for a film forming process or an etching process in recent years. The ECR plasma processing method is capable of producing a high-density plasma by electrodeless discharge in a high vacuum, of carrying out a rapid surface treatment process and of preventing the contamination of wafers.

A conventional ECR plasma processing system for carrying out an ECR plasma process will be described by way of example with reference to FIG. 7 as applied to a film forming process. Referring to FIG. 7, a microwave of, for example, 2.45 GHz is supplied through a waveguide, not shown, into a plasma producing chamber 9A and, at the same time, a magnetic field of, for example, 875 G is applied to the plasma producing chamber 9A by a solenoid 90 to convert a plasma producing gas, such as Ar gas, into a high-density plasma by the interaction (resonance) of the microwave and the magnetic field. A reactive gas, such as $C_4F_8$ gas, is activated by the plasma to produce active species. The active species is used for the simultaneous execution of a sputter etching process for etching a silicon wafer W mounted on a susceptor 91 connected to a high-frequency power supply 92 for applying a high-frequency bias voltage to the susceptor 91, and a film deposition process. The sputter etching process and the film deposition process, which are contrary to each other, are controlled so that the film deposition process is dominant for eventual film deposition.

The inventors of the present invention believe that the measurement of the negative ion density of the plasma is important for plasma processing. The ground of the belief will be described hereinafter.

For example, when a fluorine-containing carbon film (CF film) is used as a layer insulating film, a plasma produced by ionizing a CF gas is used for film formation. Ar gas, for instance, is added to the CF gas to stabilize the plasma. It is know from the respective measured electron temperatures and electron densities of a first plasma produced by ionizing only Ar gas and a second plasma produced by ionizing a mixture of Ar gas and a CF gas, such as $C_4F_8$ gas that the first and the second plasma are the same in electron temperature and that the electron density of the second plasma produced by ionizing the mixture is smaller than that of the first plasma produced by ionizing only Ar gas. A plasma is neutral and therefore, $$n_i^+=n_e+n_i \tag{1}$$

where $n_i^+$ is positive ion density, $n_e$ is electron density and $n_i^-$ is negative ion density.

It is known from the comparison of Expression (1) with the foregoing phenomenon that the fact that electron temperature does not change signifies that $n_i^+$ does not change, and the fact that $n_e$ decreases signifies that $n_i^-$ decreases; that is, negative ions are produced when $C_4F_8$ is added to Ar gas.

In the foregoing ECR plasma processing system, there are many unknown actions of the plasma. Since the microwave and the magnetic field are involved, it is difficult to produce a uniform plasma over the surface of the wafer. It is known through the examination of the results of processing, such as the intrasurface film thickness distribution, of wafers processed under the same process conditions, that, in some cases, the wafers are different from each other in intrasurface film thickness distribution. The inventors of the present invention notice negative ions as one of factors that make the control of the condition of the plasma difficult. If the plasma has an excessively large negative ion density, the effective radicals of the plasma decreases. It is considered that an excessively large negative ion density affects bias adversely. Since negative ion density is dependent on the condition of the inner surface of walls of a processing vessel defining a processing chamber, the inventors of the present invention consider that a control loop must include negative ion density as a parameter.

Generally, the negative ion density $n_i^-$ is determined by measuring positive ion density $n_i^+$ and electron density $n_e$ by a measuring method using a Langmuir probe, and calculating the negative ion density $n_i^-$ by using Expression (1). This measuring method will be briefly described. A probe is inserted in a plasma, voltage VP is applied across the probe, and an anode or a cathode serving as a discharge electrode for producing a plasma, and $n_i^+$ and $n_i^-$ are determined on the basis of current IP that flows through the probe when the voltage VP is changed.

FIG. 8 is a graph showing the dependence of the current IP on the voltage VP. The voltage VP is applied across the probe and the electrode connected to the probe. As the voltage VP increases toward the positive side, the current IP is saturated. A saturation current $I_{es}$ in this state is expressed by Expression (2).

$$I_{es}=(e/4)\cdot n_e\cdot(8k\cdot T_e/\pi m_e)^{1/2}\cdot A \tag{2}$$

As the voltage VP is decreased toward the negative side, the current IP is saturated. Saturation current $I_{is}$ in this state is expressed by Expression (3).

$$I_{is}=\{e/\exp[½]\}\cdot n_i^+\cdot(k\cdot T_e/\pi m_i)^{1/2}\cdot A \tag{3}$$

In Expressions (2) and (3), e is elementary electric charge, k is Boltzmann constant, $T_e$ is electron temperature, $m_e$ is the mass of and electron, $m_i$ is the mass of an ion, A is the effective collecting area of the probe for collecting ions and electrons. Generally, the area A is equal to the surface area S of a metal part of the probe.

The electron density $n_e$ is known from Expression (2), the positive ion density $n_i^+$ is known from Expression (3) and hence the negative ion density $n_i^-$ is known from Expression (1). Electron temperature $T_e$ can be determined on the basis of the gradient of a section of the IP-VP curve in a region where the voltage VP is positive.

Generally, the negative ion density of the plasma can be thus measured. However, this method is not applicable to a plasma produced by ECR. Since an ECR plasma processing system does not have discharge electrodes, a base end part of a probe 100 is connected through a variable-voltage power supply 200 to a ground kept at a ground potential as shown in FIG. 9. Since a magnetic field B is created around the probe 100, the effective collecting area A in Expression (2) is a surface area S' smaller than the surface area S of the metal part of the probe, because the Larmor radius of electrons in a magnetic field is small, electrons wind round lines of magnetic force, and a portion of the surface of the metal part is shaded from a flux of electrons, so that the collecting area is reduced. Consequently, the positive saturation current $I_{es}$ when the magnetic field B is created around the probe is lower than that when any magnetic field is not created around the probe as shown in FIG. 8. However, the saturation current $I_{es}$ cannot be determined because S' is unknown. Since the collection area is S in Expression (3), $I_{is}$ cam be determined. Thus, although the positive ion density $n_i$ ($n_i^+$) can be measured by a measuring method using the probe when the magnetic field is created, the electron density $n_e$ cannot be determined by the measuring method using the probe.

In the present state of art, the negative ion density $n_i^-$ is determined by measuring the electron density $n_e$ by a microwave interferometer using change in the refraction of a microwave, and using the measured electron density $n_e$ and the positive ion density $n_i^+$ measured by a method using the probe.

However, the method of measuring the electron density $n_e$ by using the microwave interferometer requires troublesome operations and hence the method is not suitable for real-time measurement and needs an expensive instrument. Another method irradiates a plasma with light to make negative ions eject electrons, measures the amount of the electrons and determines the amount of negative ions on the basis of measured amount of the electrons. However, the accuracy of this method is not satisfactory because it is not sure whether all the negative ions eject electrons.

SUMMARY OF THE INVENTION

The present invention has been made in view of the foregoing problems and it is therefore an object of the present invention to provide a method capable of simply measuring the negative ion density of a plasma, particularly, the negative ion density of a plasma produced by electron cyclotron resonance.

Another object of the present invention is to provide a technique capable of minutely controlling processing state in processing a workpiece by a plasma produced by electron cyclotron resonance.

The principle of the present invention will be described.

It is a problem in the conventional measuring method using the Langmuir probe when a magnetic field is created around the Langmuir probe that the effective collecting area A is not equal to the surface area of the metal part of the probe and is equal to an area S' smaller than the surface area S and hence Expression (2) cannot be used.

The present invention originates in noticing that the effective collecting area A cannot be used as the surface area S in a magnetic field and may be equal to the unknown area S', the area S' is a constant unaffected by the power of the microwave.

The inventors of the present invention produced a plasma by ionizing, for example, Ar (argon) gas, calculated saturation currents $I_{es}$ and $I_{is}$ by using Expressions (2) and (3), examined the mode of change of the ratio $I_{is}/I_{es}$ when the power of the microwave is changed, and found that the ratio $I_{is}/I_{es}$ is fixed regardless of the change of the power of the microwave. That is, the ratio $I_{is}/I_{es}$ which is a function of S/S' is a constant and hence S' is a constant. Accordingly, S' can be eliminated by calculating the ratio between a saturation current $I_{es}$ when a plasma is produced by ionizing Ar gas and a saturation current $I_{es}$ when a plasma is produced by ionizing $C_4F_8$ gas. The present invention has been made on the basis of this knowledge.

Suppose that a positive voltage relative to the ground is applied to the probe, a first measured saturation current $I_{es}$ measured in a first plasma produced by ionizing a first gas is $I_{es1}$ and a second measured saturation current $I_{es}$ measured in a second plasma produced by ionizing a second gas is $I_{es2}$. Similarly, suppose that ion density $n_i$, electron density $n_e$, ion mass $m_i$ and electron temperature $T_e$ with a subscript "1" denotes those obtained by measuring the first plasma of the first gas, and ion density $n_i$, electron density $n_e$, ion mass $m_i$ and electron temperature $T_e$ with a subscript "2" are those obtained by measuring the second plasma of the second gas. The first gas, i.e., an inert gas, is, for example Ar gas. The second gas for producing negative ions is $C_4F_8$ gas.

Expression (3) mentioned in the description of the background of the invention is rewritten according to this rule to provide Expressions (4) and (5) respectively expressing $I_{is1}$ and $I_{is2}$.

$$I_{is1}=\{e/\exp[½]\}\cdot n_{i1}^+(k\cdot T_{e1}/\pi m_{i1})^{1/2}\cdot S \qquad (4)$$

$$I_{is2}=\{e/\exp[½]\}\cdot n_{i2}^+(k\cdot T_{e2}/\pi m_{i2})^{1/2}\cdot S \qquad (5)$$

Therefore, the ratio $I_{is2}/I_{is1}$ is expressed by:

$$I_{is2}/I_{is1}=(n_{i2}^+/n_{i1}^+)\cdot(T_{e2}/T_{e1})^{1/2}\cdot(m_{i1}/m_{i2})^{1/2} \qquad (6)$$

Therefore, the ratio $n_{i2}^+/n_{i1}^+$ is expressed by:

$$n_{i2}^+/n_{i1}^+=(I_{is2}/I_{is1})\cdot(T_{e1}/T_{e2})½\cdot(m_{i2}/m_{i1})^{1/2} \qquad (7)$$

Expression (2) mentioned in the description of the background of the invention is rewritten according to the rule to obtain Expressions (8) and (9).

$$I_{es1}=(e/4)\cdot n_{e1}\cdot(8k\cdot T_{e1}/\pi m_e)^{1/2}\cdot S' \qquad (8)$$

$$I_{es2}=(e/4)\cdot n_{e2}\cdot(8k\cdot T_{e2}/\pi m_e)^{1/2}\cdot S' \qquad (9)$$

Therefore, the ratio $n_{i2}^+/n_{i1}^+$ is expressed by:

$$I_{es2}/I_{es1}=(n_{e2}/n_{e1})\cdot(T_{e2}/T_{e1})^{1/2} \qquad (10)$$

Therefore, the ratio $n_{e2}/n_{e1}$ is expressed by:

$$n_{e2}/n_{e1}=(I_{es2}/I_{es1})\cdot(T_{e1}/T_{e2})^{1/2} \qquad (11)$$

Expression (12) is formed from Expression (1) mentioned in the description of background of the invention, and Expression (13) is obtained by dividing both sides of Expression (12) by $n_{i1}^+$.

$$n_{i2}^+=n_{e2}+n_i^- \qquad (12)$$

$$\begin{aligned}(n_{i2}^+/n_{i1}^+) &= (n_{e2}/n_{e1})+(n_i^-/n_{i1}^+) \qquad (13)\\ &= (n_{e2}/n_{e1})+(n_i^-/n_{e1})\end{aligned}$$

The foregoing expressions is rewritten on an assumption that $n_{i1}^+=n_{e1}$ because the plasma produced by ionizing Ar gas does not contain any negative ion.

Expression (14) is obtained by substituting $n_{i2}^+/n_{i1}^+$ expressed by Expression (7) and $n_{e2}/n_{e1}$ expressed by Expression (11) into Expression (13). Magnetic fields of the same intensity and microwaves of the same frequency and the same power are used for ionizing the first and the second gas. The electron temperatures $T_{e1}$ and $T_{e2}$ are scarcely different from each other and $T_{e1}/T_{e2}$ is approximately 1. Therefore, $$(I_{is2}/I_{is1})\cdot(m_{i2}/m_{i1})^{1/2}\approx(I_{es2}/I_{es1})+(n_i^-/n_{e1}) \quad (14)$$

A method of measuring the negative ion density of a plasma according to the present invention determines negative ion density $n_i^-$ by using Expression (14) and measured values of $I_{is1}$, $I_{is2}$, $I_{es1}$ and $I_{es2}$.

Although the negative ion density of the plasma produced by ionizing only $C_4F_8$ gas has been discussed above, practically, a mixed gas prepared by adding Ar gas to $C_4F_8$ gas is ionized to produce a stable plasma when forming a film or a semiconductor wafer or when etching a film formed on a semiconductor wafer. In such a case, $m_{i2}$ of Expression (14), i.e., the reduced mass of dominant positive ions among the positive ions of the mixed gas prepared by adding Ar gas to $C_4F_8$ gas, is equal to $m_{i1}\cdot\alpha+m(CF_2^+)\cdot(1-\alpha)$, where $M(CF_2^+)$ is the mass of $CF_2^+$ and $\alpha$ is the ratio of the flow rate of Ar gas to that of the mixed gas.

When a $C_4F_8$ plasma contains a plurality of kinds of main ions, i.e., when the $C_4F_8$ plasma contains $CF_4^+$ ions, $C_2F_4^+$ ions, . . . as main ions, $n_{i2}^+$ is expressed by:

$$n_{i2}^+=n_i(Ar^+)+n_i(CF_4^+)+n_i(C_2F_4^+) \quad (15)$$

Therefore, the reduced mass $m_{i2}$ in the mixed gas is expressed by:

$$m_{i2}=\frac{n_i(Ar^+)\cdot m_{i1}+n_i(CF_4^+)\cdot m(CF_4^+)+n_i(C_2F_4^+)\cdot m(C_2F_4^+)}{n_i(Ar^+)+n_i(CF_4^+)+n_i(C_2F_4^+)+\dots} \quad (16)$$

In Expression (16), $m_{i1}$ is the mass of ions produced by ionizing the first gas, such as $Ar^+$ ions produced by ionizing Ar gas and $m_{i2}$ is the reduced mass of ions dominant in the plasma produced by ionizing the second gas. If a single kind of ions are dominant, the reduced mass may be equal to the mass of the ions. If the plasma contains a plurality of kinds of dominant ions, the reduced mass is used. The value of $n_{e1}$ is considered to be equal to that of $n_i^+$, the same can be calculated by using Expression (4).

Although it is possible to consider that $T_{e1}/T_{e2}=1$, $T_{e1}$ and $T_{e2}$ may be determined individually. In FIG. 1 showing the relation between current and voltage VP, the inclination of a section indicated by dotted line of a curve between a point where current is zero and a point in a positive region where current is saturated corresponds to $8k\cdot T_{e1}/\pi m_e$. Therefore $T_{e1}$ and $T_{e2}$can be determined on the basis of the section of the curve.

To achieve the foregoing object, the present invention provides, on the basis of the foregoing principle, a method of measuring the negative ion density of a plasma, and a plasma processing method using the method of measuring the negative ion density of a plasma.

The method of measuring the negative ion density of a plasma according to the present invention comprises the steps of:

(a) supplying a first gas, which is an inert gas, into a vacuum chamber and ionizing the first gas to produce a first plasma;

(b) bringing the first plasma into contact with a probe having a base end connected through a variable-voltage power supply to a ground;

(c) measuring a saturation current $I_{es1}$ at which current flowing through the probe is saturated when the potential of the probe is changed by the variable-voltage power supply in a potential region where the potential of the probe is higher than a ground potential, and a saturation current $I_{is1}$ at which current flowing through the probe is saturated when the potential of the probe is changed by the variable-voltage power supply in a potential region where the potential of the probe is lower than the ground potential;

(d) supplying a second gas containing a gas for producing negative ions into the vacuum chamber and ionizing the second gas to produce a second plasma;

(e) bringing the second plasma into contact with the probe having the base end connected through the variable-voltage power supply to the ground;

(f) measuring a saturation current $I_{es2}$ at which current flowing through the probe is saturated when the potential of the probe is changed by the variable-voltage power supply in a potential region where the potential of the probe is higher than the ground potential, and a saturation current $I_{is2}$ at which current flowing through the probe is saturated when the potential of the probe is changed by the variable-voltage power supply in a potential region where the potential of the probe is lower than the ground potential; and (g) determining the negative ion density $n_{i1}^-$ of the second plasma produced by ionizing the second gas by using $I_{is1}/I_{is2}$, $I_{es1}/I_{es2}$, $m_{i1}$, $m_{i2}$ and $n_{e1}$, where $m_{i1}$ is the mass of positive ions of the first gas, $m_{i2}$ is the reduced mass of dominant positive ions among positive ions of the second gas and $n_{e1}$ is the electron density of the first plasma.

The present invention provides also a plasma processing method using the method of measuring negative ion density of a plasma.

The present invention is applicable not only to elucidation of a state of a plasma but also to the control of a plasma processing system for processing a workpiece, such as a wafer, for a film forming process or an etching process using a plasma produced by subjecting a process gas to, for example, ECR. Control parameters, such as the pressure of the vacuum chamber and the flow rate of the gas, for controlling the plasma are controlled on the basis of the obtained (estimated) negative ion density. The method of ionizing the gas to produce a plasma is not limited to that which uses ECR, the method may be that which uses the energy of a microwave for ionizing a gas.

The present invention provides a plasma processing system that ionizes a process gas supplied into a vacuum chamber to produce a plasma, and uses the plasma for processing a workpiece, comprising: a probe having a base end connected through a variable-voltage power supply to a ground and disposed so as to come into contact with the plasma produced in the vacuum chamber; a current measuring device for measuring current that flows through the probe; a negative ion density measuring means for changing voltage applied to the probe by the variable-voltage power supply, sampling data on voltage applied to the prove and current that flows through the probe when an inert gas is ionized and when a mixed gas containing a process gas and an inert gas is ionized, and determining the negative ion density of a component of the process gas on the basis of the data; and a control parameter control means for controlling control parameters to be controlled to control a plasma on the basis of the negative ion density measured by the negative ion density measuring means.

The present invention provides also a negative ion density measuring apparatus comprising a probe having a base end connected through a variable-voltage power supply to a ground and disposed so as to come into contact with a plasma; a current measuring device for measuring a current that flows through the probe; and a negative ion density measuring means for changing voltage applied to the probe by the variable-voltage power supply, sampling data on voltage applied to the prove and current that flows through the probe when an inert gas is ionized and when a mixed gas containing a process gas and an inert gas is ionized, and determining the negative ion density of a component of the process gas on the basis of the data. The negative ion density of a plasma produced by ECR can be simply measured by the method of measuring negative ion density according to the present invention. Process conditions for a process for processing a workpiece by using a plasma can be minutely controlled by the plasma processing method and the plasma processing system according to the present invention for processing a workpiece in a high intrasurface uniformity.

DESCRIPTION OF THE PREFERRED EMBODIMENTS

Figure 1:
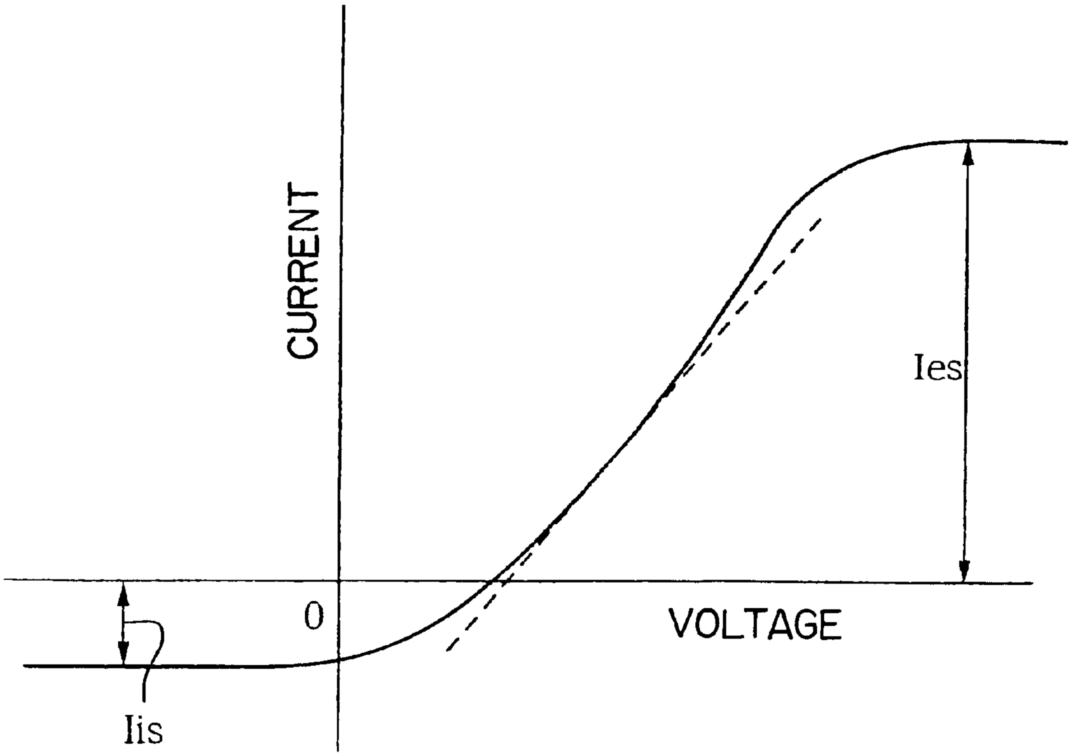
FIG. 1 is a graph showing the current-voltage characteristic of a probe.
Figure 2:
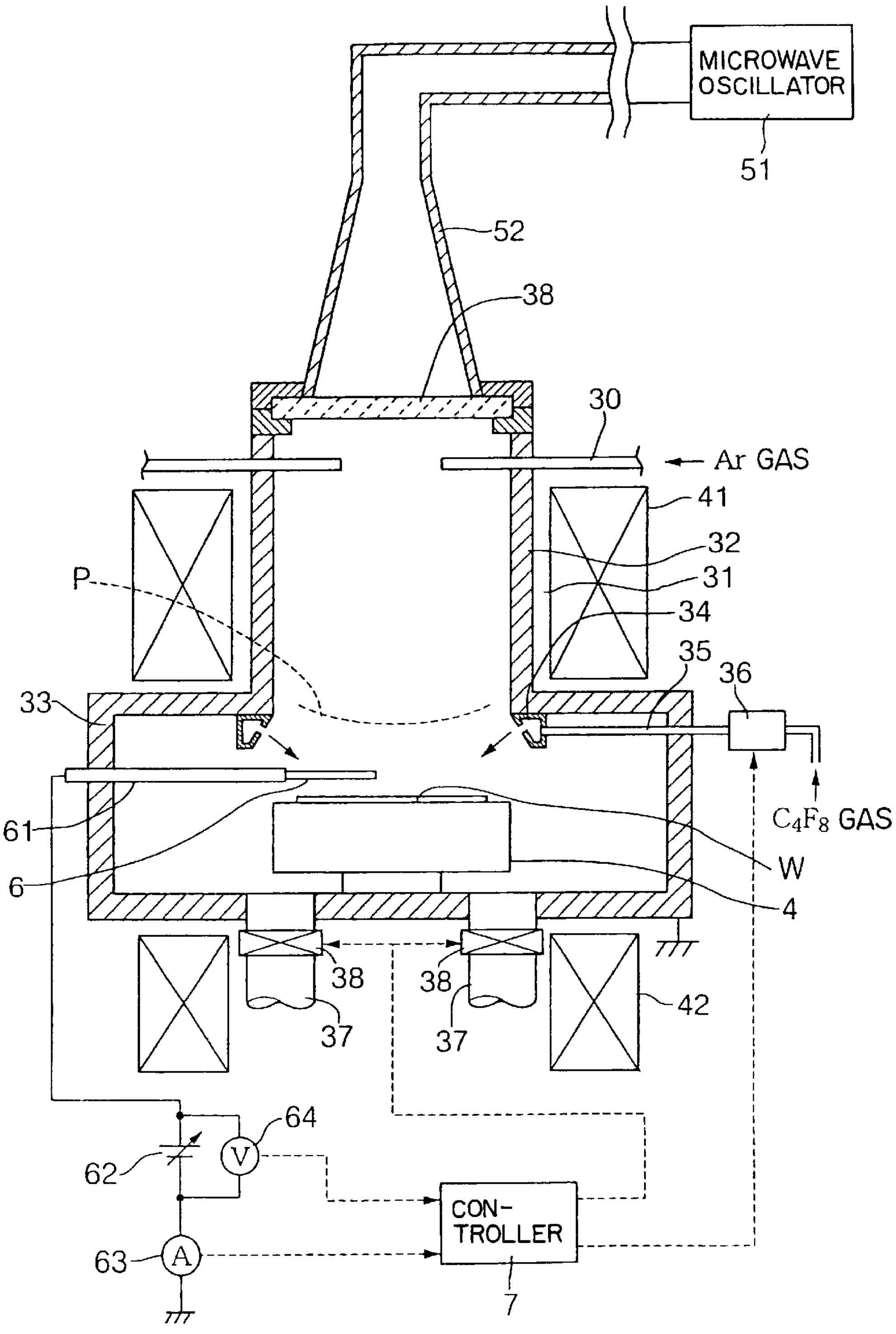
FIG. 2 is a sectional view of a plasma processing system in a preferred embodiment according to the present invention for carrying out a plasma processing method according to the present invention.

FIG. 2 shows a plasma processing system in a preferred embodiment according to the present invention for carrying out a plasma processing method according to the present invention.

Referring to FIG. 2, a vacuum processing vessel 31 has walls made of, for example, aluminum and defining a vacuum processing chamber. The vacuum processing vessel 31 is grounded. The vacuum processing vessel 31 is constructed by connecting a cylindrical first vacuum vessel 32 of a small diameter and a cylindrical second vacuum vessel 33 of a great diameter. Plasma gas supply nozzles 30 are arranged at equal angular intervals on the side wall of the first vacuum vessel 32 so as to project radially into a first vacuum chamber defined by the first vacuum vessel 32. A ring-shaped gas supply member 34 is disposed in the second vacuum vessel 33. A film forming gas supplied through a gas supply pipe 35 is distributed in the vacuum processing vessel 31 by the gas supply member 34. A flow adjusting device 36 is placed in the gas supply pipe 35 to adjust the flow of a gas supplied from a gas source, not shown.

A susceptor 4 for supporting a semiconductor wafer W thereon is disposed in the second vacuum vessel 33. A high-frequency power supply, not shown, is connected to the susceptor 4 to apply a bias voltage for attracting ions to the wafer W to the susceptor 4. Evacuating pipes 37 are connected to the second vacuum vessel 33. The evacuating pipes 37 are connected through pressure adjusting devices 38 each including a butterfly valve to a vacuum pump, not shown.

A main solenoid 41, i.e., a magnetic field creating means, is disposed so as to surround the first vacuum vessel 32, and an auxiliary solenoid 42, i.e., a magnetic field creating means, is disposed under the second vacuum vessel 33. The solenoids 41 and 42 creates magnetic fields represented by lines of magnetic force of a predetermined shape in the vacuum processing vessel 31 and to create a magnetic filed of 875 G in intensity at an ECR point.

An open upper end of the vacuum processing vessel 31 is covered with a transparent plate 38 of a dielectric material that transmits microwaves. A waveguide 52 is connected to the transparent plate 38. The waveguide 52 propagates a microwave of 2.45 GHz generated by a microwave oscillator 51 in a TM mode, such as TM01 mode, into the first vacuum vessel 32.

A probe 6 is attached to the tip of a support rod 61 hermetically inserted through a hole formed in the side wall of the second vacuum vessel 33 so as t be axially slidable. The probe 6 is connected through a variable-voltage power supply 62 and an ammeter 63 to a ground. A voltmeter 64 is connected across the variable-voltage power supply 62. A current measured by the ammeter 63 and a voltage measured by the voltmeter are given to a controller 7. The controller 7 calculates the negative ion density of a plasma on the basis of the values of the current and the voltage given thereto, and gives control signals according to the result of calculation to the flow adjusting device 36 and the pressure adjusting devices 38.

Figure 3:
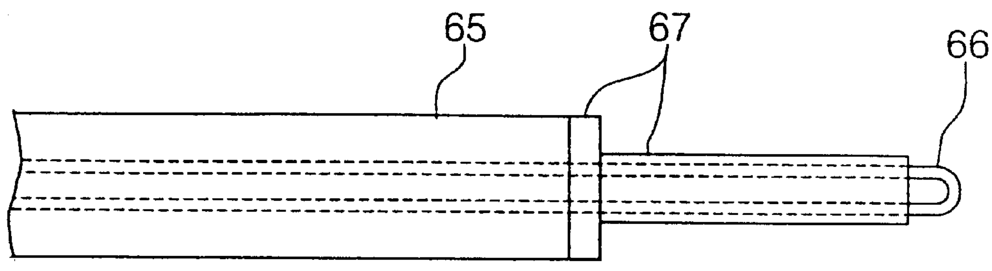
FIG. 3 is a fragmentary side elevation of a probe.
Figure 4:
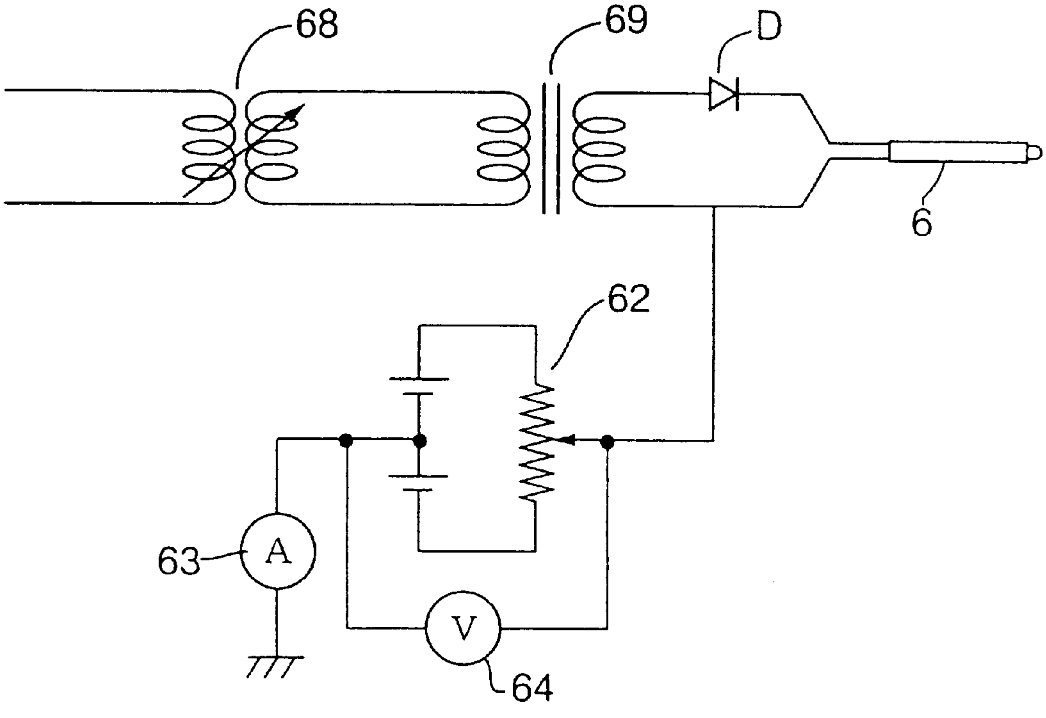
FIG. 4 is a circuit diagram of a circuit connected to the probe.

As shown in FIG. 3, the probe has, for example, a stainless steel pipe 65, a metal wire, such as a 0.1 mm diameter tungsten wire, extended in the stainless steel pipe 65, and a ceramic coating 67 coating a part of the metal wire 66 projecting from the stainless steel pipe 65 so that a small tip portion of the metal wire 66 is exposed. As shown in FIG. 4, ac power is supplied to the metal wire 66 to prevent the deposition of a CF film on the metal wire 66 by making the metal wire 66 generate heat. Shown in FIG. 4 are a slide rheostat 68, a transformer 69 and a diode D.

In operation, the probe 6 is retracted from a region extending over the susceptor 4 and is located at a position near the side wall of the second vacuum vessel 33 to avoid obstructing a process for processing a wafer W by the probe 6. A carrying arm, not shown, carries a wafer into the second vacuum vessel 33 and puts the same on the susceptor 4. Ar gas is supplied at 200 sccm through the plasma gas supply nozzles 30 into the vacuum processing vessel 31. $C_4F_8$ gas, i.e., a process gas, is supplied from the gas supply member 34 at, for example, 50 sccm into the vacuum processing vessel 31. The vacuum processing vessel 31 is evacuated through the evacuating pipes 37 in a vacuum in the range of 1 to 5 mtorr.

Microwave of 2.45 GHz and 1500 W generated by the microwave oscillator 51 is propagated into the vacuum processing vessel 31. A magnetic field of 875 G in magnetic flux density is created in a region P represented by dotted line by the solenoids 41 and 42. The Ar gas is ionized to produce a plasma by electron cyclotron resonance that occurs at an ECR point P. The $C_4F_8$ gas is activated by the plasma to deposit a fluorine-containing carbon film (CF film) on the wafer W. The Ar gas is added to the $C_4F_8$ gas to stabilize the plasma and to etch the surface of the wafer W by sputtering.

After a predetermined number of wafers W have been processed, the probe 6 is moved to a measuring position above a central part of the susceptor 4 to measure the density of negative ions contained in the plasma by the following method. During negative ion density measurement, plasma processing process is interrupted.

Figure 5:
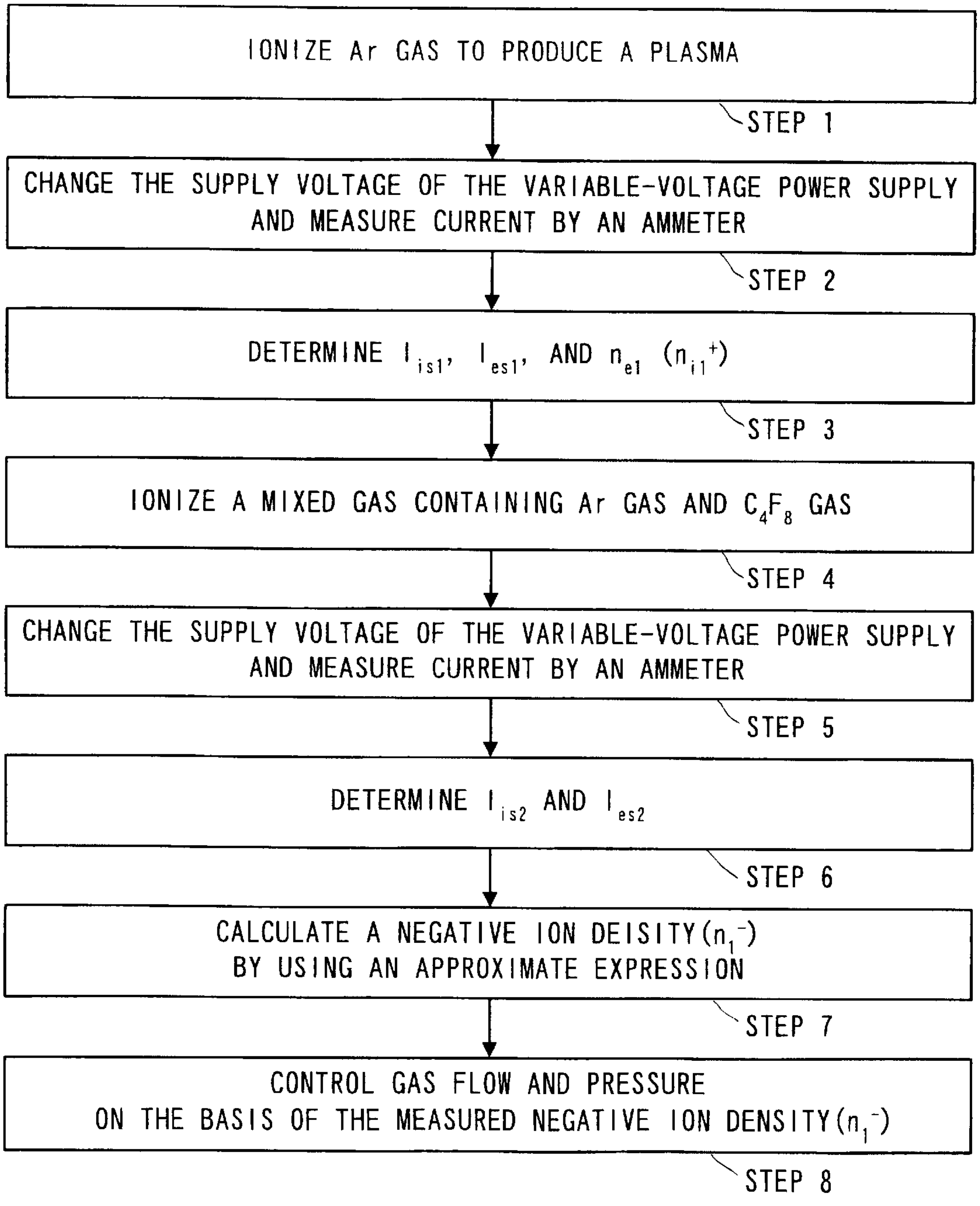
FIG. 5 is a flow chart showing a plasma processing method in a preferred embodiment according to the present invention.

Referring to FIG. 5, in Step 1, a plasma is produced in the vacuum processing vessel 31 by the same method as that by which the plasma is produced for the foregoing plasma processing process, except that only Ar gas, i.e., a first gas, is supplied through the plasma gas nozzles 30 at, for example, 200 sccm into the vacuum processing vessel 31 and the $C_4F_8$ gas is not supplied into the vacuum processing vessel 31.

The supply voltage of the variable-voltage power supply 62 is varied to change the potential of the probe 6 from a negative value toward a positive value. Voltages indicated by the voltmeter 64 and currents indicated by the ammeter 63 are given to the controller 7 in Step 2, and $I_{is1}$ and $I_{es1}$ are determined in Step 3.

The mass $m_{i1}$ of Ar ions is known, $T_{e1}$ can be determined from a curve of $I_{es1}$, and the collecting area of the probe 6 in Expression (4) is the surface area S of the exposed part of the metal wire 66 of the probe 6. Therefore, positive ion density $n_{i1}^+$ is determined by using Expression (4) in Step 3. The positive ion density $n_{i1}^+$ is equal to electron density $n_{e1}$. Steps 1 to 3 need not be necessarily continuously followed by Step 4 and the following steps; data obtained by executing Steps 1 to 3 may be stored in a proper storage device.

Subsequently, Ar gas and $C_4F_8$ gas are supplied at flow rates at which the same gases are supplied for the vacuum processing process. In Step 4, a plasma is produced by the same method as that by which the plasma is produced when processing the wafer W. Similarly, controller 7 determines saturation currents $I_{is2}$ and $I_{es2}$ in Steps 5 and 6. $Ar^+$ and $CF_2^+$ are considered to be dominant ions in the plasma, and negative ion density $n_i^-$ is determined by substituting the mass $m_{i2}$ of ions determined by the following method, and previously determined $I_{is1}$, $I_{ies1}$, $n_{i1}^+$, $I_{is2}$ and $I_{es2}$ into Expression (14) in Step 7. Note that, considering flow rate of Ar gas and $C_4F_8$ gas, the reduced mass $m_{i2}$ of dominant positive ions is calculated by: $m_{i2}=m_{i1}\cdot(200/250)+m(CF_2^+)(50/250)$, where $m(CF_2^+)$ is a mass of $CF_2^+$ ion.

Subsequently, the controller 7 gives control signals according to the negative ion density $n_i^-$ to the flow adjusting device 36 and the pressure adjusting devices 38 to control the flow rate of $C_4F_8$ gas and the pressure in the vacuum processing vessel 31 in Step 8. The amount of radicals effective for processing the wafer W decreases if the amount of negative ions is large. In such a case, the flow rate of $C_4F_8$ gas is reduced and the pressure is reduced.

The relation between negative ion density, and the flow rate and the pressure is determined beforehand through the experimental determination of the relation between negative ion density, and the condition of the processed wafer W, such as the intrasurface uniformity of the thickness of the film, negative ion density that is used when a film of thickness unsatisfactory in uniformity is formed, and proper flow rate and pressure adjustments for such a case are determined and control conditions may be stored in a storage device.

Control parameters to be controlled on the basis of the measured negative ion density may be the flow rate of Ar gas, the power of the microwave and currents supplied to the solenoids 41 and 42.

The control parameters are adjusted on the basis of negative ion density, and then the probe 6 is retracted from the measuring position above the susceptor 4, and then operations for processing wafers W are resumed. The process gas may be a hydrocarbon gas, such as $C_2F_4$ gas, other than $C_4F_8$ gas.

In this embodiment, the control parameters to be controlled to control the plasma, such as the flow rate of the gas and the pressure in the vacuum processing vessel 31, are adjusted on the basis of the measured negative ion density. Therefore, the plasma can be minutely controlled and the uniformity of the film formed on the surface of the wafer W can be improved and intersurface difference in film thickness can be reduced. Since data on the first plasma produced by ionizing the first gas (Ar gas) and the second plasma produced by ionizing the second gas, i.e., a mixed gas of Ar gas and $C_4F_8$ gas, may be measured by the probe 6, negative ion density can be simply measured and measurement can be achieved with high reliability higher than that of measurement of electrons ejected by irradiating a plasma with light.

The inert gas is not limited to Ar gas; the inert gas may be krypton gas or xenon gas. The process gas is not limited to a CF gas, such as $C_4F_8$ gas; the process gas may be a silane gas, such as $SiH_4$ gas used for forming a $SiO_2$ film. The present invention is applicable not only to a film forming process but also to an etching process for etching, for example, a $SiO_2$ film with a CF gas.

Although measurement using the probe 6 is carried out with the probe located at the measuring position above the susceptor 4 in the foregoing embodiment, measurement may be carried out with the probe 6 located at a position outside a region extending above the susceptor 4. When the probe 6 is located at a position outside a region above the susceptor 4, negative ion density can be measured during the process for processing the wafer. When negative ion density is measured with the probe 6 located at a position outside a region above the susceptor 4, the correlation between measurements obtained by the probe 6 located at the measuring position above the susceptor 4 and those obtained by the probe 6 located at a position outside a region above the susceptor 4 must be determined beforehand.

EXAMPLES

Operations for the experimental determination of negative ion density $n_i^-$ will be described.

Figure 6:
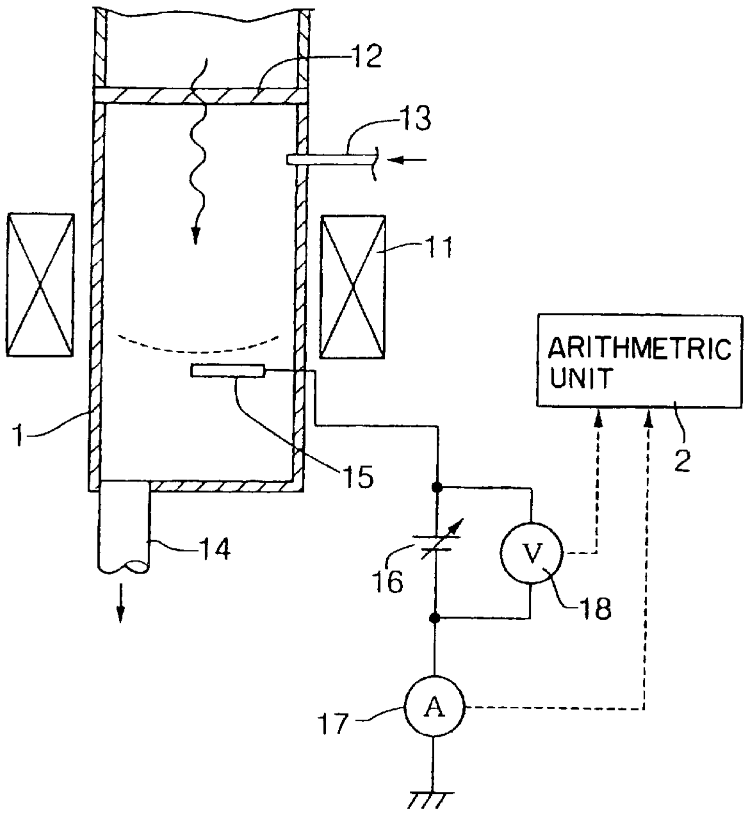
FIG. 6 is a negative ion density measuring system in a preferred embodiment according to the present invention for carrying out a negative ion density measuring method according to the present invention.
Figure 7:
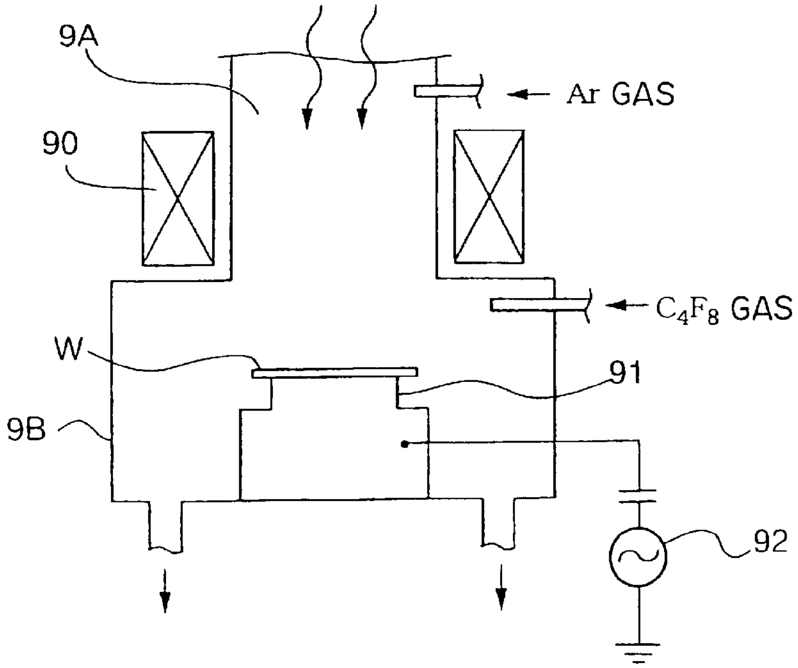
FIG. 7 is a schematic view of a conventional ECR plasma processing system.
Figure 8:
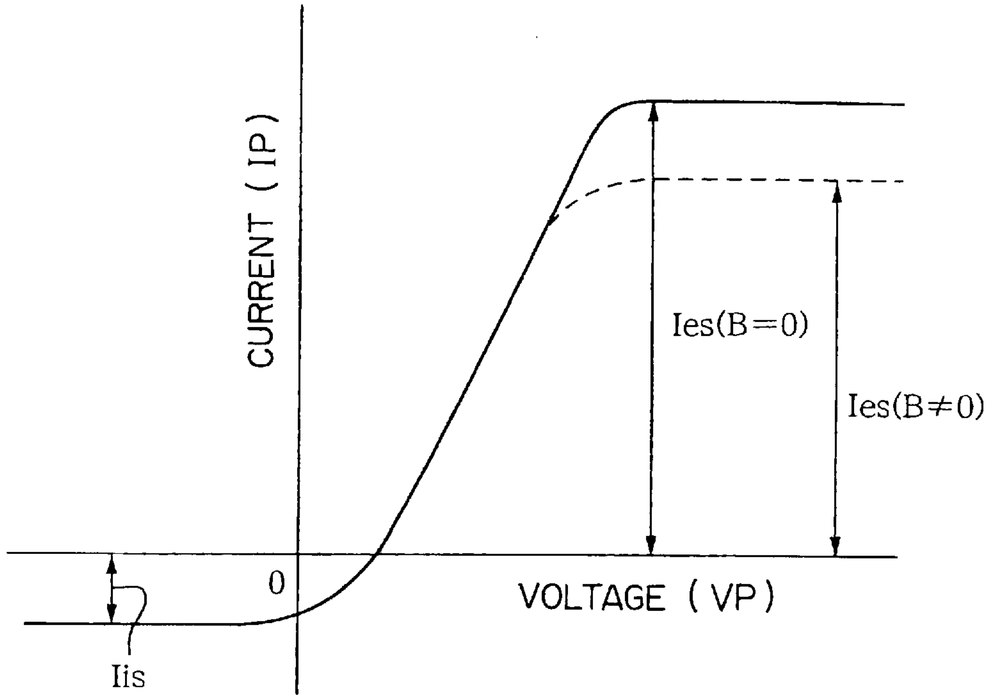
FIG. 8 is a graph showing the current-voltage characteristic of a probe employed in a Langmuir probe method.
Figure 9:
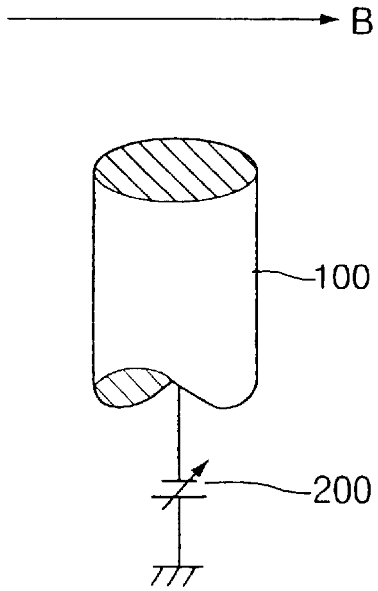
FIG. 9 is a schematic view showing the collecting area of a probe employed in a Langmuir probe method.

A negative ion density measuring system typically shown in FIG. 6 was used for the experiments. Referring to FIG. 6, a negative ion density measuring system includes a cylindrical vacuum vessel 1 defining a vacuum chamber, and a solenoid 11. Dotted line in the vacuum vessel 1 indicates a region where the magnetic flux density of a magnetic field created by the solenoid 11 is 875 G, i.e. an ECR point. Electron cyclotron resonance is caused by a microwave of 2.45 GHz propagated through a transparent plate 12 into the vacuum vessel 1 and a magnetic field to ionize a gas supplied through a gas supply pipe 13 into the vacuum vessel 1 by electron cyclotron resonance. Indicated at 14 is an evacuating pipe. As shown in FIG. 6, a probe 15 is disposed, for example, near the ECR point. The probe is connected through a variable-voltage power supply 16 and an ammeter 17 to a ground. The supply voltage of the variable-voltage power supply 16 is measured by a voltmeter 18. Values of current and voltage measured, respectively, by the ammeter 17 and the voltmeter 18 are given to an arithmetic unit 2. The arithmetic unit 2 is able to acquire data on the current-voltage characteristic of the probe 15 when voltage exceeds the voltage of the variable-voltage power supply 16.

Ar gas was supplied at 30 sccm through the gas supply pipe 13 into the vacuum vessel 1, a plasma was produced in the vacuum vessel 1, and $I_{is1}$ and $I_{es1}$ and $n_{e1}$ were measured. Subsequently, Ar gas and $C_4F_8$ gas were supplied at 22.5 sccm and 7.5 sccm, respectively, through the gas supply pipe into the vacuum vessel 1 and $I_{is2}$ and $I_{es2}$ were measured. The pressure in the vacuum vessel 1 was kept at 1.t mtorr and a microwave of 2.45 GHz and 2 kW was used. Main species were equal amounts of $CF^+$ and $C_2F_4^+$.

Measured values $I_{es1}$=0.75 mA $I_{es1}$=37 mA $n_{e1}=2.5\times10^{10}/cm^2$ $m_{i1}=6.7\times10^{-23}$ g $m_{i2}=7.8\times10^{-23}$ g $I_{is2}$=0.63 mA $I_{es2}$=13 mA These measured values were substituted into expression (14) to calculate negative ion density.

$n_i^-=1.4\times10^{10}/cm^2$

What is claimed is:

1. A method of measuring negative ion density of a plasma, said method comprising the steps of:

supplying a first gas, which is an inert gas, into a vacuum chamber and ionizing the first gas to produce a first plasma;

bringing the first plasma into contact with a probe having a base end connected through a variable-voltage power supply to a ground;

measuring a saturation current $I_{es1}$ at which current flowing through the probe is saturated when potential of the probe is changed by the variable-voltage power supply in a potential region where the potential of the probe is higher than a ground potential, and a saturation current $I_{is1}$ at which current flowing through the probe is saturated when potential of the probe is changed by the variable-voltage power supply in a potential region where the potential of the probe is lower than the ground potential;

supplying a second gas containing a gas for producing negative ions into the vacuum chamber and ionizing the second gas to produce a second plasma;

bringing the second plasma into contact with the probe having the base end connected through the variable-voltage power supply to the ground;

measuring a saturation current $I_{es2}$ at which current flowing through the probe is saturated when potential of the probe is changed by the variable-voltage power supply in a potential region where the potential of the probe is higher than the ground potential, and a saturation current $I_{is2}$ at which current flowing through the probe is saturated when potential of the probe is changed by the variable-voltage power supply in a potential region where the potential of the probe is lower than the ground potential; and determining negative ion density $n_{i1}^-$ of the second plasma produced by ionizing the second gas by using $I_{is1}/I_{is2}$, $I_{es1}/I_{es2}$, $m_{i1}$, $m_{i2}$ and $n_{e1}$, where $m_{i1}$ is mass of positive ions of the first gas, $m_{i2}$ is reduced mass of dominant positive ions among those of the second gas and $n_{e1}$ is electron density of the first plasma.

2. The method according to claim 1, wherein the negative ion density $n_i^-$ is determined by using an approximate expression:

$$(I_{is2}/I_{is1})\cdot(m_{i2}/m_{i1})^{1/2}\approx(I_{es2}/I_{es1})+(n_{i1}^-/n_{e1}).$$

3. The method according to claim 1 or 2, wherein each of the step of ionizing the first gas to produce the first plasma and the step of ionizing the second gas to produce the second plasma applies a microwave and a magnetic field to the gas to cause electron cyclotron resonance.

4. A plasma processing method that ionizes a process gas supplied into a vacuum chamber to produce a plasma and uses the plasma to process a workpiece comprising the steps of:

supplying a first gas, which is an inert gas, into a vacuum chamber and ionizing the first gas to produce a first plasma;

bringing the first plasma into contact with a probe having a base end connected through a variable-voltage power supply to a ground;

measuring a saturation current $I_{es1}$ at which current flowing through the probe is saturated when potential of the probe is changed by the variable-voltage power supply in a potential region where the potential of the probe is higher than a ground potential, and a saturation current $I_{is1}$ at which current flowing through the probe is saturated when potential of the probe is changed by the variable-voltage power supply in a potential region where the potential of the probe is lower than the ground potential;

supplying a second gas containing a gas for producing negative ions into the vacuum chamber and ionizing the second gas to produce a second plasma;

bringing the second plasma into contact with the probe having the base end connected through the variable-voltage power supply to the ground;

measuring a saturation current $I_{es2}$ at which current flowing through the probe is saturated when potential of the probe is changed by the variable-voltage power supply in a potential region where the potential of the probe is higher than the ground potential, and a saturation current $I_{is2}$ at which current flowing through the probe is saturated when potential of the probe is changed by the variable-voltage power supply in a potential region where the potential of the probe is lower than the ground potential;

determining negative ion density $n_{i1}^-$ of the second plasma produced by ionizing the second gas by using $I_{is1}/I_{is2}$, $I_{es1}/I_{es2}$, $m_{i1}$, $m_{i2}$ and $n_{e1}$, where $m_{i1}$ is mass of positive ions of the first gas, $m_{i2}$ is reduced mass of dominant positive ions among those of the second gas and $n_{e1}$ is electron density of the first plasma; and controlling control parameters for controlling the plasma on the basis of the negative ion density $n_{i1}^-$.

5. A plasma processing method that ionizes a process gas supplied into a vacuum chamber to produce a plasma and uses the plasma for processing a workpiece comprising the steps of:

determining saturation currents $I_{es1}$ eand $I_{is1}$ beforehand and storing the same, said determining step including the steps of:

supplying a first gas, which is an inert gas, into the vacuum chamber and ionizing the same to produce a first plasma;

bringing the first plasma into contact with a probe having a base end connected through a variable-voltage power supply to a ground; and measuring the saturation current $I_{es1}$ at which current flowing through the probe is saturated when potential of the probe is changed by the variable-voltage power supply in a potential region where the potential of the probe is higher than a ground potential, and the saturation current $I_{is1}$ at which current flowing through the probe is saturated when potential of the probe is changed by the variable-voltage power supply in a potential region where the potential of the probe is lower than the ground potential;

supplying a second gas containing a gas for producing negative ions into the vacuum chamber and ionizing the same to produce a second plasma;

bringing the second plasma into contact with the probe having the base end connected through the variable-voltage power supply to the ground;

measuring a saturation current $I_{es2}$ at which current flowing through the probe is saturated when potential of the probe is changed by the variable-voltage power supply in a potential region where the potential of the probe is higher than the ground potential, and a saturation current $I_{is2}$ at which current flowing through the probe is saturated when potential of the probe is changed by the variable-voltage power supply in a potential region where the potential of the probe is lower than the ground potential;

determining negative ion density $n_{i1}^-$ of the second plasma produced by ionizing the second gas by using $I_{is1}/I_{is2}$, $I_{es1}/I_{es2}$, $m_{i1}$, $m_{i2}$ and $n_{e1}$, where $m_{i1}$ is mass of positive ions of the first gas, $m_{i2}$ is reduced mass of dominant positive ions among those of the second gas and $n_{e1}$ is electron density of the first plasma; and controlling control parameters for controlling the plasma on the basis of the negative ion density $n_{i1}^-$.

6. The plasma processing method according to claim 4 or 5, wherein the negative ion density $n_{i1}^-$ is determined by using an approximate expression:

$$(I_{is2}/I_{is1})\cdot(m_{i2}/m_{i1})^{1/2}\approx(I_{es2}/I_{es1})+(n_{i1}/n_{e1})$$

7. A plasma processing system for ionizing a process gas supplied into a vacuum chamber to produce a plasma for processing a workpiece, the plasma processing system comprising:

a probe having a base end connected through a variable-voltage power supply to a ground and disposed so as to come into contact with the plasma produced in the vacuum chamber;

a current measuring device for measuring current flowing through the probe;

a negative ion density measuring means for changing voltage applied to the probe by the variable-voltage power supply, for sampling data on voltage applied to the probe and current flowing through the probe when an inert gas is ionized and when a mixed gas containing a process gas and an inert gas is ionized, and for determining the negative ion density of a component of the process gas on the basis of the data; and a control means for controlling control parameters in order to control a plasma on the basis of the negative ion density measured by the negative ion density measuring means.

8. A negative ion density measuring apparatus comprising:

a probe having a base end connected through a variable-voltage power supply to a ground and disposed so as to come into contact with a plasma;

a current measuring device for measuring current flowing through the probe; and a negative ion density measuring means for changing voltage applied to the probe by the variable-voltage power supply, for sampling data on voltage applied to the probe and current flowing through the probe when an inert gas is ionized and when a mixed gas containing a process gas and an inert gas is ionized, and for determining the negative ion density of a component of the process gas on the basis of the data.

* * * * *

UNITED STATES PATENT AND TRADEMARK OFFICE

CERTIFICATE OF CORRECTION

PATENT NO. : 6,452,400 B1
DATED : September 17, 2002
INVENTOR(S) : Yoshinobu Kawai et al.

It is certified that error appears in the above-identified patent and that said Letters Patent is hereby corrected as shown below:

Column 11,
Line 64, "$n_i^-$" should read -- $n_{il}^-$ --.
Line 67, "≈" should read -- ≒ --.

Column 12,
Line 55, "eand" should read -- and --.

Column 13,
Line 34, "≈" should read -- ≒ --.

Signed and Sealed this

Eighteenth Day of February, 2003

JAMES E. ROGAN
*Director of the United States Patent and Trademark Office*